United States Patent [19]

Suzuki

[11] 4,129,890
[45] Dec. 12, 1978

[54] MAGNETIC RECORDING AND REPRODUCING APPARATUS

[75] Inventor: Shoji Suzuki, Iwaki, Japan

[73] Assignee: Alps Motorola, Tokyo, Japan

[21] Appl. No.: 836,266

[22] Filed: Sep. 26, 1977

[30] Foreign Application Priority Data

Sep. 29, 1976 [JP] Japan .............................. 51-116797

[51] Int. Cl.² .......................................... G11B 15/18
[52] U.S. Cl. ................................................... 360/94
[58] Field of Search ......................................... 360/94

[56] References Cited

U.S. PATENT DOCUMENTS

| 3,561,767 | 2/1971 | Negishi | 360/94 |
| 3,703,295 | 11/1972 | Yamamoto et al. | 360/94 |

Primary Examiner—Robert S. Tupper
Attorney, Agent, or Firm—James W. Gillman; Donald J. Lisa; Phillip H. Melamed

[57] ABSTRACT

A magnetic recording and reproducing apparatus is provided which is selectively applicable for tape cartridges and tape cassettes and which is formed with an entryway into which a tape cartridge or a tape cassette is to be inserted. A first magnetic tape head is located deeper in the entryway for playing the tape contained in the cartridge and a second magnetic tape head is located below the entryway for playing the tape contained in the cassette. A holder for receiving and conveying the tape cassette is positioned in the entryway when neither the tape cartridge nor the tape cassette is inserted into the entryway. Also a holder positioning mechanism is provided for moving the holder downward out of the entryway when the tape cartridge is inserted into the entryway, thereby permitting the tape cartridge to be pushed deeper into the entryway so that the cartridge tape can come into cooperative engagement with the first magnetic tape head. The holder positioning mechanism also moves the holder downward into a predetermined position where the cassette tape can come into cooperative engagement with the second magnetic tape head when the holder receives the tape cassette therein.

11 Claims, 32 Drawing Figures

MAGNETIC RECORDING AND REPRODUCING APPARATUS

BACKGROUND OF THE INVENTION

This invention relates to an improved magnetic tape recording and reproducing apparatus and, more particularly, to a magnetic recording and reproducing apparatus selectively applicable both to a tape cartridge containing an endless magnetic tape and a tape cassette containing a magnetic tape driven in reel-to-reel operation.

In general, two kinds of tape packs, one known as cassette type containing a magnetic tape fed in reel-to-reel operation and the other known as cartridge type containing an endless tape, are available on the market. However, two kinds of tape players are required for recording or reproducing such different type tape packs because of differences in the shape of the tape packs and their driving mechanisms, as well as other differences.

SUMMARY OF THE INVENTION

Accordingly, it is an object of this invention to provide an improved magnetic tape recording and reproducing apparatus selectively applicable both to a tape cartridge and a tape cassette which will be free from the above mentioned and other disadvantages of the prior art devices.

In accordance with the present invention, there is provided a magnetic recording and reproducing apparatus comprising reel drive axles, a cassette tape capstan, a cartridge tape capstan, an entryway (charging or loading path) into which a tape cartridge or a tape cassette is to be inserted, a first magnetic tape head located deeper in the entryway for playing the tape contained in the cartridge, a second magnetic tape head located below the entryway for recording and reproducing the tape contained in the cassette, and a holder for receiving and conveying the tape cassette which is placed in the entryway when neither the tape cartridge nor the tape cassette is inserted into the entryway. Also provided is means responsive to the cartridge being inserted into the entryway to move the holder downward out of the entryway thereby permitting the cartridge to be pushed deeper into the entryway so that the cartridge tape can come into cooperative engagement with the first magnetic tape head. The means also serves to sense the cassette being received in the holder for moving the holder downward in a predetermined position where the cassette tape can come into cooperative engagement with the second magnetic tape head.

Preferably, the means comprises a movable member connected to the holder, a switch device having first and second elements, the first element of which is so disposed in the entryway that an inserted tape cartridge will push the first element to turn the switch device on and the second element of which is so disposed in the holder that an inserted tape cassette will push the second element to turn on the switch device, and a solenoid plunger having a plunger member connected to the movable member which is energized to move the plunger member when the switch is turned on, thereby permitting the movable member to move the holder downward.

Other objects and advantages of the present invention will become apparent to those skilled in the art from a consideration of the following detailed description of one embodiment of the invention.

BRIEF DESCRIPTION OF THE DRAWINGS

The following description of the invention is in conjunction with the accompanying drawings, in which like reference characters refer to the same or corresponding parts, and in which all the figures show portions of a magnetic recording and reproducing apparatus wherein.

DESCRIPTION OF THE PREFERRED EMBODIMENT

Figure 1:
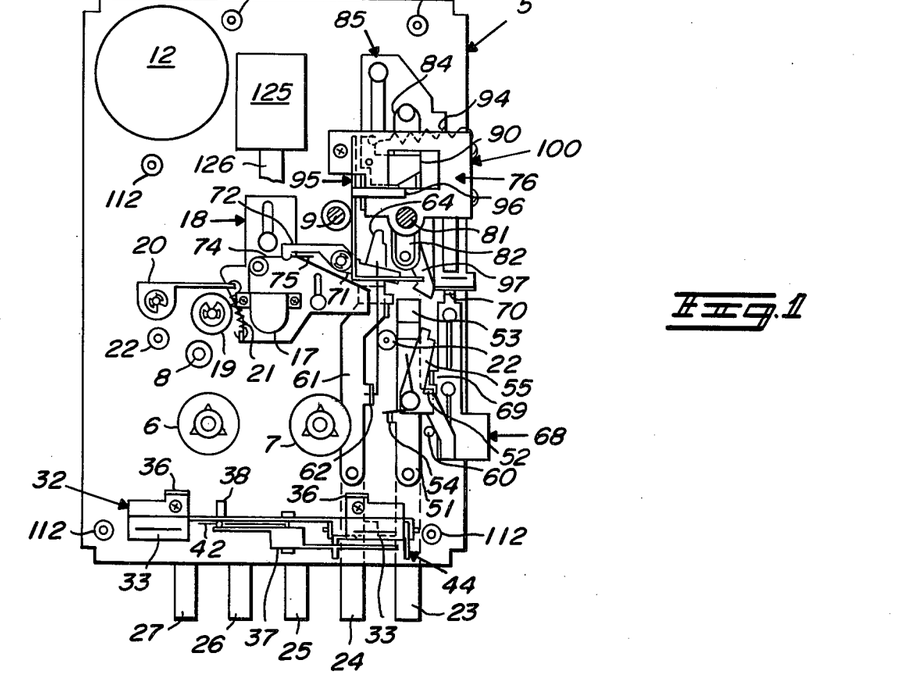
FIG. 1 is a top plan view showing mechanisms disposed on a base frame in accordance with the present invention.

Referring now to the drawings, and initially to FIG. 1 thereof, there is illustrated a tape deck disposed on a base frame 5 of a magnetic recording and reproducing apparatus constructed in accordance with the present invention. Initially the detailed construction of the magnetic recording and reproducing apparatus will be discussed, subsequently the operation of the apparatus will be discussed.

Disposed on the base frame 5 are a take-up reel axle 6, a supply reel axle 7 and a capstan drive 8 for driving the tape in a cassette 1 placed in a lowered predetermined position in the apparatus. Another capstan drive 9 is also disposed on the rear portion of the base frame 5 for driving the tape in a cartridge 3.

Figure 2:
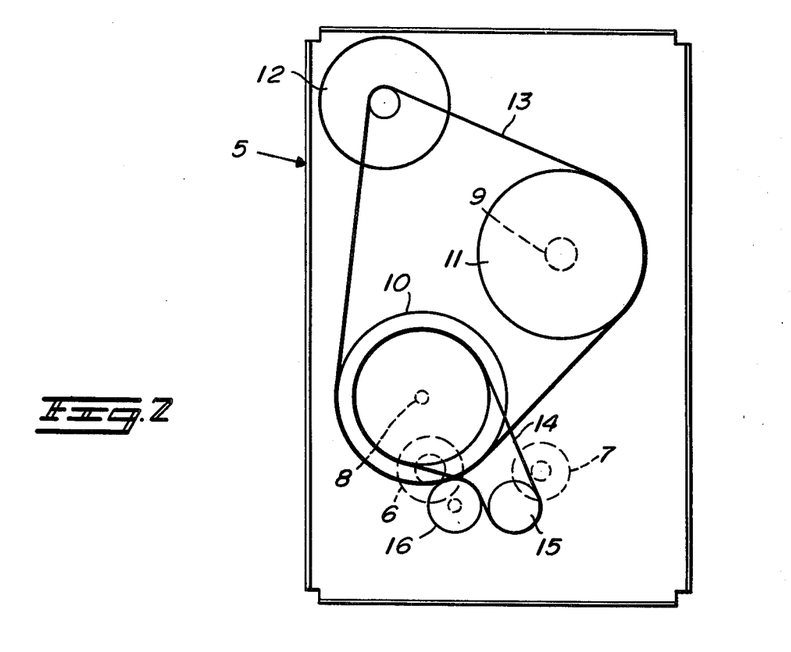
FIG. 2 is a top plan diagramatic view showing a drive mechanism used for the present invention.

As shown in FIG. 2, the capstans 8 and 9 have respective flywheels 10 and 11 thereon which are rotated from a motor 12 through a drive belt 13 to rotate the respective capstans 10 and 11. The rotation of the flywheel 10 is transmitted through a belt 14 to an idler wheel 15 which in turn is coupled to the reel axles 6 and 7 through not shown idler wheels. A drive pulley 16 is also provided which is adapted to shift in the recording and reproducing modes of operation of the tape cassette 1 for driving the takeup reel axle 6.

Referring back to FIG. 1, the reference numeral 18 indicates a head supporter having a magnetic tape head 17 secured thereon, which supporter 18 is adapted to shift in the forward and rearward direction. The numeral 20 designates a pinch roller supporter having a pinch roller 19 thereon and pivotally mounted to the base frame 5. A coil spring 21 is disposed between the head supporter 18 and the pinch roller supporter 20 so as to pull the pinch roller supporter 20 to move the pinch roller 19 thereon into engagement with the capstan drive 8 when the head supporter 18 is shifted forwardly.

Figures 6, 7, 8, 9:
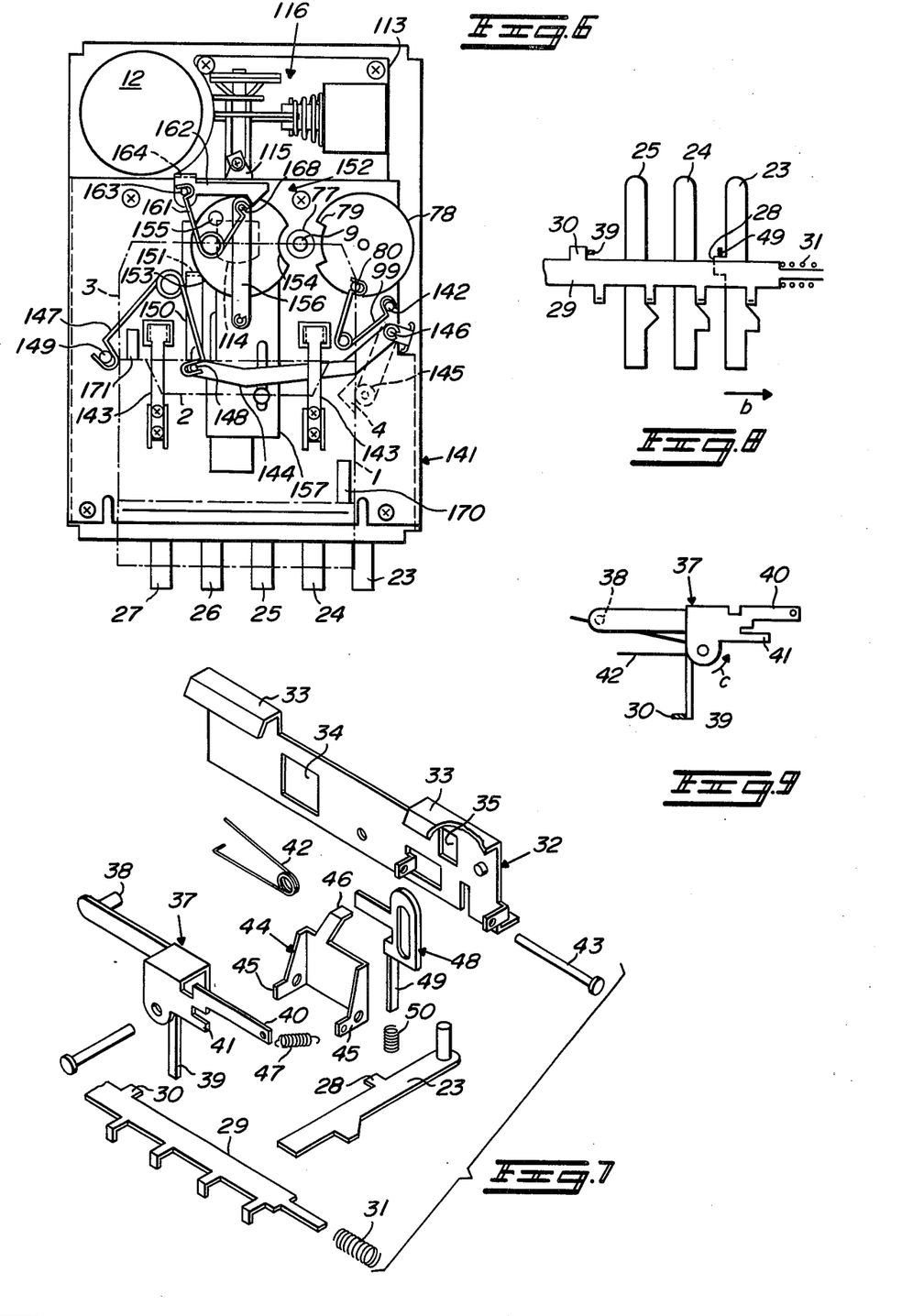
FIG. 6 is a top plan view showing a portion of the magnetic recording and reproducing apparatus with the tape cartridge and the tape cassette shown in full engagement with the apparatus.
FIG. 7 is an exploded view of a safety member and an anti-miserase member in relation to a front plate.
FIG. 8 is a top plan view showing the operation of operation rods of the present apparatus.
FIG. 9 is a side view showing the operation of the safety member.

The reference numerals 22 and 22 designate guide pins formed on the base frame 5 for placing the tape cassette 1 in a predetermined position. The reference numeral 23 indicates a recording operation rod, the numeral 24 a reproducing operation rod, the numeral 25 a stop operation rod, the numeral 26 a fast forward operation rod and the numeral 27 a rewind operation rod, each of the operation rods 24 to 27 being extended through and slidably supported by a front panel of the base frame 5. The respective operation rods, except for the stop operation rod 25, are maintained in their operation position by a stopper member 29 as shown in FIGS. 7 and 8. The recording operation rod 23 is formed with an extension 28, and the stopper member 29 is formed with an extension 30 and is spring biased in a direction by a coil spring 31.

The reference numeral 32 designates a front plate secured to the base frame 5. The front plate 32 is provided with shoulders 33 and 33 for guiding the tape cassette 1 or the tape cartridge 3 during the insertion thereof and formed with apertures 34 and 35 as shown particularly in FIGS. 4 and 7.

Figure 3:
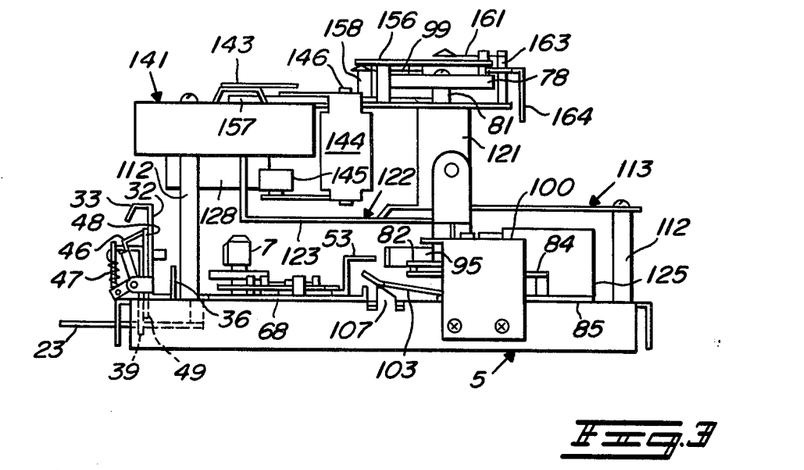
FIG. 3 is a side view of the magnetic recording and reproducing apparatus of the present invention with the entryway shown charged with neither the tape cartridge nor the tape cassette.

In FIGS. 1 and 3, the reference numerals 36 and 36 indicate spaced projections formed on the front plate 32 on which the tape cassette 1 rests when placed in the predetermined position.

A safety member generally designated by the reference numeral 37 is mounted on the front plate 32 for vertically pivotal movement and is provided with a pin 38 extending inwardly through the aperture 34 of the front plate 32 so that the tape cassette 1 can push the pin 38 to rotate the safety member when the cassette 1 is lowered. As shown in FIGS. 3, 7 and 9 in detail, the safety member 37 has a lock 39 extending through the base frame 5 into engagement with the extension 30 of the stopper member 29 for preventing the stopper member from moving in the rightward direction (FIG. 8), and a first arm 40, a second arm 41, and a spring member 42 for normally biasing the safety member 37 upwards.

An anti-miserase member generally indicated by the reference numeral 44 is mounted on the front plate 32 for forward and rearward pivotal movement by a shaft 43. The anti-miserase member 44 generally prevents unintentional erasing of magnetic tape and has legs 45 and 45 and an inturned arm 46 extending through the aperture 35 of the front plate 32 into the engagement with a not shown hole or hole cover formed in the cassette side wall. A spring member 47 is disposed between the first arm 40 of the safety member 37 and one leg 45 of the anti-miserase member 44 so that the anti-miserase member 44 is rotated as the safety mechanism 37 rotates downwards. The second arm 41 of the safety member 37 is in place on the other leg 45 of the anti-miserase member 44 and when the safety member 37 is rotated upwards to its original position, the anti-miserase member 44 has its leg 45 pressed by the second arm 41 and is pulled by the force of the spring member 47 so as to be rotated forwards to its original position.

The reference numeral 48 indicates a lock member slidable vertically up and down with the pivotal movement of the anti-miserase member 44. The member 48 has a lock 49 extending through the base frame 5 into engagement with the extension 28 of the recording operation rod 23 for preventing the recording operation rod 23 from being pushed as shown particularly in FIGS. 3 and 7. A spring member 50 is provided for normally spring biasing the lock 49 upwards.

Figures 10, 11, 12, 13A, 13B, 13C:
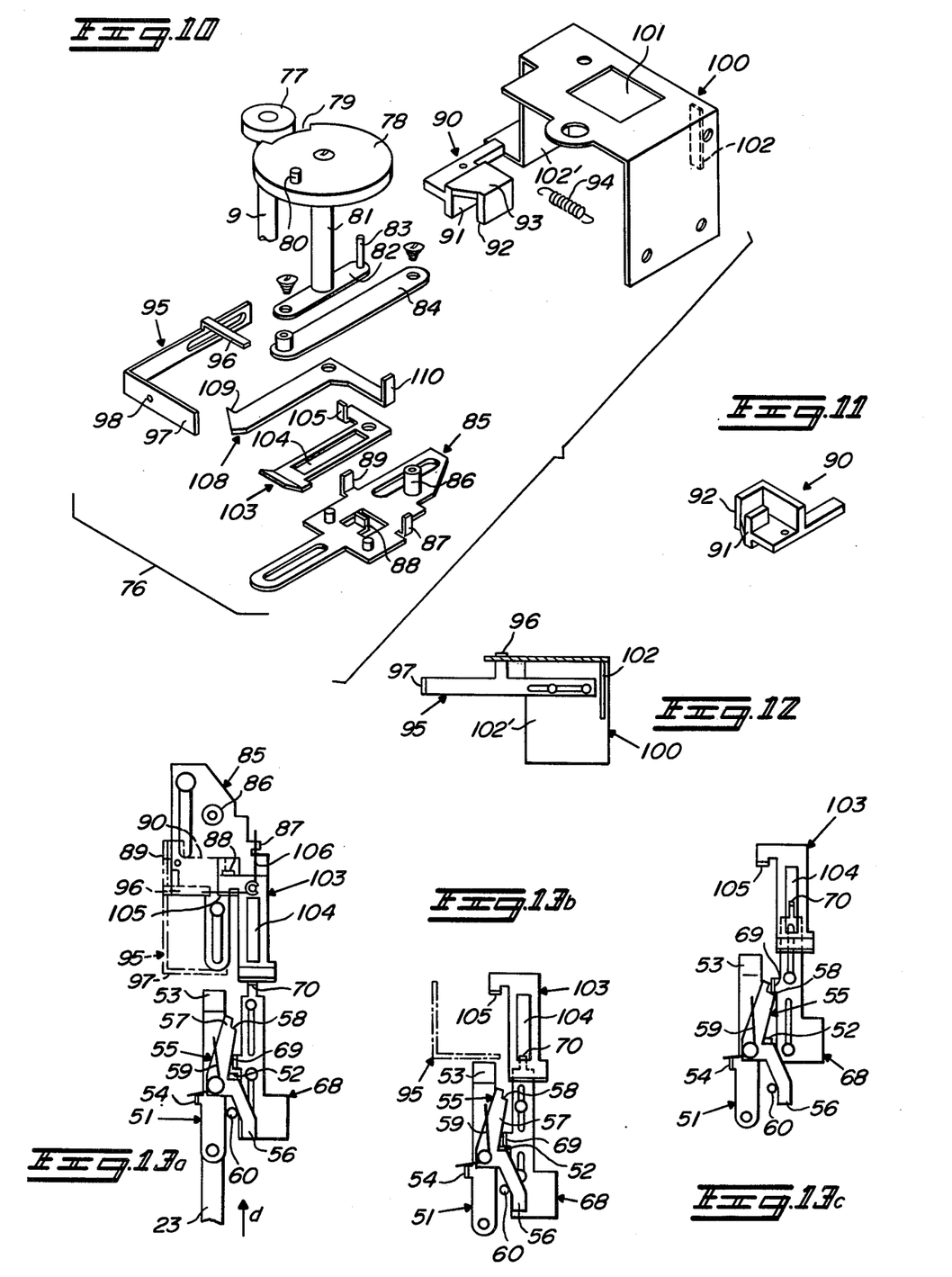
FIG. 10 is an exploded view of a torque reducing (saving) mechanism.
FIG. 11 is a perspective view of the restriction member of the torque reducing mechanism.
FIG. 12 is a sectional side view of the auxiliary frame shown in FIG. 10 showing the operation of the release arm.
FIGS. 13a to 13c are top plan views showing the operation of the recording member in relation with the torque reducing mechanism.

As shown in FIGS. 1 and 13, the reference numeral 51 indicates a recording operation member coupled to the recording operation rod 23 which is moved as the recording operation rod 23 moves. The recording operation member 51 has first and second drive portions 52 and 53, and an upturned portion 54. Pivotably mounted on the recording operation member 51 is a stopper arm 55 composed of a first arm 56 functioning as a stopper and a second arm 57 formed with a stopping portion 58 for retaining in a predetermined position a recording lever 68 which will be described later. The stopper arm 55 is normally biased in a direction by a spring member 59 so that the first arm 56 is urged into engagement with a pin 60 provided on the base frame 5.

Figure 16A:
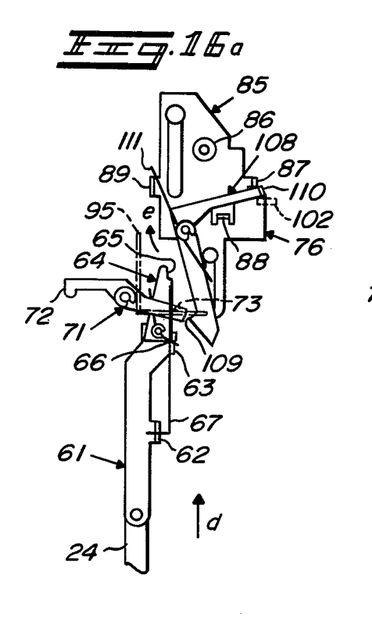
FIGS. 16a to 16c are top plan views showing the operation of the reproducing member in connection with the torque reducing mechanism.
Figure 16B:
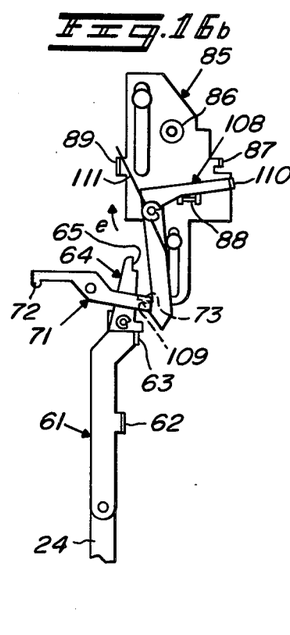
Figure 16C:
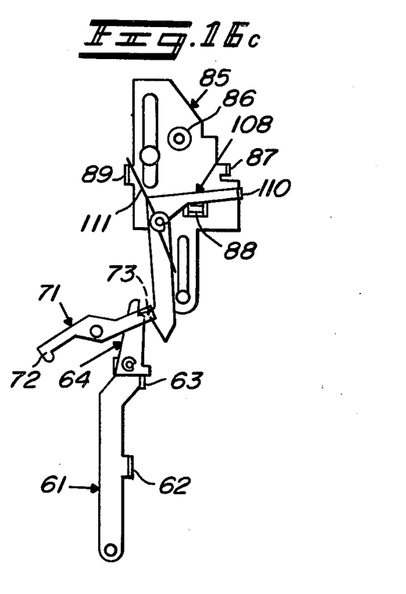

As shown particularly in FIGS. 1 and 16, the reference numeral 61 indicates a reproducing operation member coupled to the reproducing operation rod 24 and which is moved when the reproducing operation rod 24 moves. The reproducing operation member 61 has an upturned portion 62 and a stopper 63. Pivotably mounted on the reproducing operation member 61 is a stopper arm 64 formed with a stopping portion 65. The stopper arm 64 is normally spring biased in a direction by a spring member 66 so that the part of the stopping arm 64 is urged into engagement with the stopper 63 of the reproducing operation member 61. The reference numeral 67 designates a control member having its one end attached to the upturned portion 62 of the reproducing operation member 61 and the other end thereof extending through a release arm 95 to be described. The control member 61 may be formed of a piano wire as shown in the embodiment.

In FIG. 13, the reference numeral 68 indicates a recording lever mounted on the base frame 5 for forward and rearward sliding movement so as to actuate a not shown switch and thereby cause a not shown circuit to switch from the recording mode to the reproducing mode, or from the reproducing mode to the recording mode. The recording lever 68 is formed with an upturned portion 69 which is initally in engagement with the first drive portion 52 of the recording operation member 51 and then is engaged with the stopping portion 58 of the stopper arm 55 when the recording lever 68 moves to a predetermined position so that the recording lever 68 is maintained in the predetermined position. Also, the recording lever 68 has an upturned portion 70 formed at its tip end with which a torque reducing (saving) mechanism 76, as will be described in detail subsequently, is associated so as to slide the recording lever 68.

Figures 14A, 14B, 14C, 17:
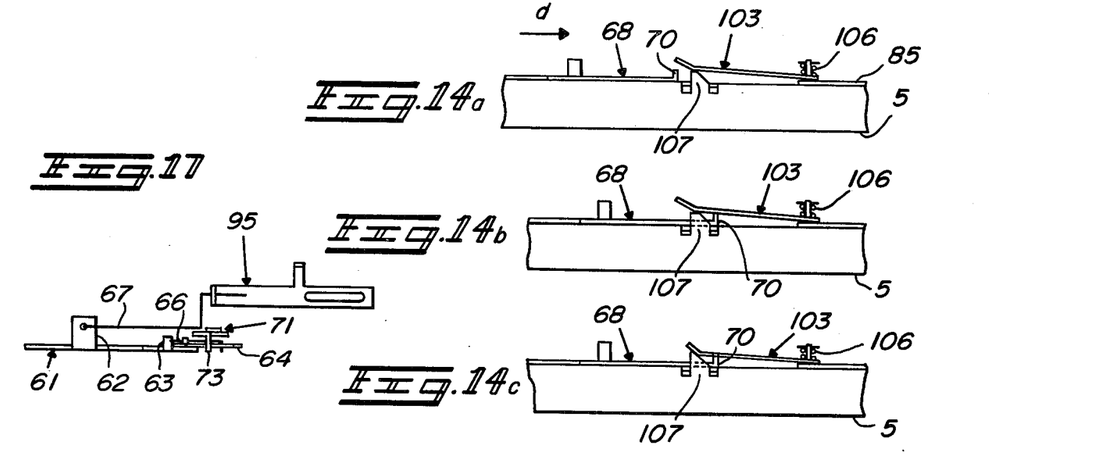
FIGS. 14a to 14c are side views showing the operational relation between the recording lever and the lock lever.
FIG. 17 is a side view showing the operation of the reproducing member in connection with the torque reducing mechanism.

In FIGS. 16 and 17, the reference numeral 71 indicates a rotary arm pivotally mounted on the base frame 5, the one tip end 72 of which is spring biased by a spring member 74 mounted on the head supporter 17 (see FIG. 1) and the other tip end of which is formed with a stopper 73. The stopper 73 is associated with the torque mechanism 76 to be described so that operation of the torque reducing mechanism 76 causes the rotary arm 71 to rotate. Such rotation of the rotary arm 71 also causes the head supporter 18 to be moved in the forward direction while at the same time causing the stopper 73 of the rotary arm 71 to come into engagement with the stopping arm 64 of the reproducing operation member 61 so that the rotary arm 71 can be retained in the position.

The reference numeral 76 designates a torque reducing mechanism for reducing the torque of the recording and reproducing operation members 51 and 61. As best shown in FIG. 10, the torque reducing mechanism comprises a rotary member 78 formed with a recess 79. A frictional drive wheel 77 which may be formed of rubber or the like is provided on the cartridge capstan 9 for rotating the rotary member 78 when in engagement therewith, while the drive wheel 77 is normally out of engagement from the rotary member 78 and facing the recess 79 of the rotary member 78. The torque reducing mechanism 76 further comprises a rotary shaft 81 of the rotary member 78, a rotary lever 82 having its center attached to the rotary shift 81, a crank lever 84 having its one end attached to one end of the rotary lever 82, a sliding member 85 coupled to the crank lever 84 for reciprocating movement, a restriction member 90 having first and second legs 91 and 92 for maintaining the rotary member 78 out of engagement from the drive rotor 77, a release arm 95 having an arm 96 for pushing and rotating the restriction member 90 so as to release the restriction of the restriction member 90, and a biasing member 99 for providing an initial rotation to the rotary member (see FIG. 6). The rotary lever 82 is provided on the other end thereof with a pin 83 in engagement with the first or second leg 91 or 92, normally with the second leg 92, for restricting the rotary member 78 from rotating. The restriction member 90 is pivotally mounted on an auxiliary frame 100 which is secured on the base frame 5. Also, the restriction member 90 is spring biased in a direction by a spring member 94 (FIG. 10) and has a part 93 extending outwards through an aperture 101 formed in the auxiliary frame 100 into engagement with the release arm 95. As best shown in FIG. 12, the release arm 95 is slidably mounted on an inner wall 102' of the auxiliary frame 100 and provided with a bent portion 97 in cooperative engagement with the drive portion 53 of the recording operation member 51 and the control member 67 fixed to the reproducing operation member 61 for sliding the release arm 95 (see FIGS. 13, 16 and 17). The bent portion 97 is formed with a hole 98 through which the control member 67 extends. The sliding member 85 is slidably mounted on the base frame 5 and provided with a shaft 86 to which the other end of the crank lever 84 is attached so that the sliding member 85 reciprocates as the crank lever 84 rotates. Also, the sliding member 85 is formed with first, second and third upturned portions 87, 88 and 89. A biasing member 99, which may be comprised of a toggle spring as shown in FIG. 6, has its one end attached to the pin 80 of the rotary member 78 and the other end thereof attached to a pin 142 provided on a cover 141 which will be described later.

The reference numeral 103 (FIG. 13) indicates a rock lever pivotally mounted on the sliding member 85 and formed with an upturned portion 105 and an elongated opening 104 in engagement with the upturned portion 70 of the recording lever 68.

In FIGS. 13 and 14, the reference numeral 106 indicates a spring member for restricting the oscillation of the rock lever 103, the one end of which is in abutment on the upturned portion 105 of the rock lever 103 as shown in FIG. 13a and the other end of which is in abutment on the first upturned portion 87 of the sliding member 85. The tendency of the rock lever 103 to rotate in a clockwise direction is limited by the second upturned portion 88. As shown in FIG. 14a, the rock lever 103 normally rests on projection 107 formed on the base frame 5 so as to be out of engagement from the recording lever 68.

In FIG. 10, the reference numeral 108 designates a substantially L-shaped hook lever pivotally mounted on the sliding member 85. The hook lever 108 is formed with a hook portion 109 in engagement with the stopper 73 of the rotary arm 71 and an upturned portion 110 (FIG. 16). As shown in FIG. 16a, a spring 111 is disposed between the hook lever 108 and the third upturned portion 89 of the sliding member 85 so as to urge the hook lever in a clockwise direction indicated by the arrow e into engagement with the second upturned portion 88 of the sliding member 85. The upturned portion 110 of the hook lever 108 is illustrated in abutment with a stopper 102 (see FIGS. 10 and 16) of the auxiliary frame 100 which limits the clockwise rotation of the hook lever 108.

In FIG. 1, the reference numeral 112 indicates shafts through which the cover 141 and an intermediate base plate 113 to be described are attached to the base frame 5.

Figures 4, 5:
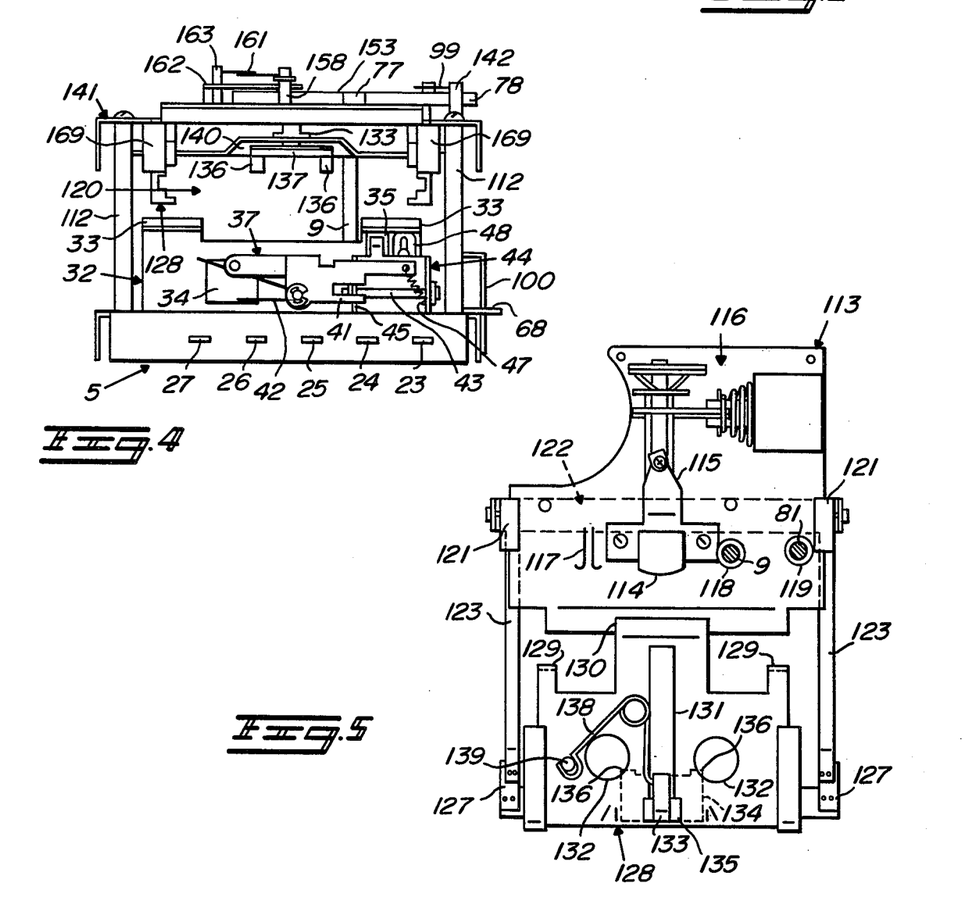
FIG. 4 is a front view of the unloaded magnetic recording and reproducing apparatus of FIG. 3.
FIG. 5 is a top plan view showing mechanisms disposed on an intermediate base plate.

Particularly in FIGS. 3 and 5, the reference numeral 113 indicates an intermediate base plate attached through the shafts 112 to the base frame 5. Disposed and fixed on the intermediate base plate are a head supporter 115 having thereon a magnetic tape head 114 for the cartridge 3, a channel selecting mechanism 116 for moving the head supporter 115 vertically up and down so as to switch the magnetic head 114 into a desired channel, and a contact switch 117 for activating the channel selecting mechanism 116 in reponse to the position of a conductive foil piece affixed on the magnetic tape contained within the cartridge 3. The cartridge capstan axle 9 is disposed on the base frame 5 and extends through a hole 118 to the intermediate base plate 113.

A cartridge entryway (charging or loading path) 120 (see FIGS. 3, 4 and 5) is formed by the front plate 32 and the cover 141 through which the tape cartridge 3 is inserted so that part of the cartridge 3 rests on the intermediate base plate 113 and the magnetic tape comes into engagement with the contact switch 117, the magnetic tape head 114 and the cartridge capstan drive 9. The reference numeral 119 indicates a hole in the base plate 113 through which the rotary shaft 81 of the torque reducing mechanism 76 is extended.

The reference numerals 121 and 121 (FIG. 5) indicate spaced projections extending upwards from the opposite sides of the intermediate base plate 113. Pivotally mounted to the spaced projections 121 and 121 is a movable member 122 (FIG. 3) having two arms 123 and 123. The movable member 122 has a projection 124 (FIG. 21) extending downwards from the under surface thereof and coupled to a plunger member 126 of a solenoid plunger 125 mounted on the base frame 5 so that the movable member 122 rotates as the plunger member 126 moves.

Figure 21:
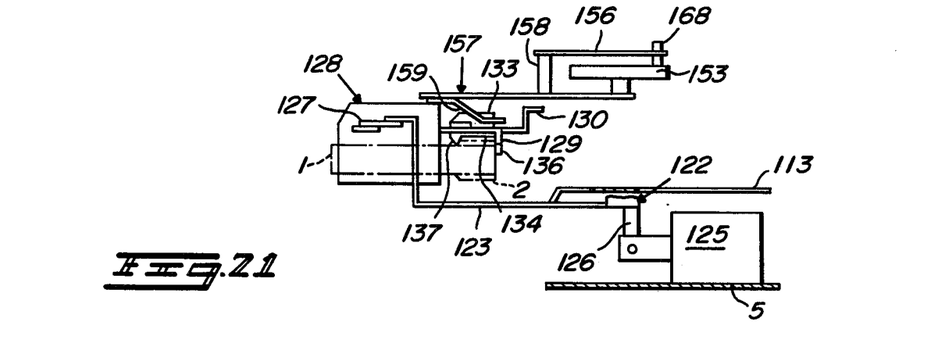
FIG. 21 is a side view showing the cassette charged in the holder.

In FIG. 21, the reference numeral 128 designates a holder for placing the cassette 1 in a predetermined position. The holder is mounted through leaf springs 127 and 127 on the arms 123 and 123 of the movable member 122. Pieces 129 and 129 are provided in the rearward portion of the holder 128 for preventing the cassette 1 from slipping out. The reference numeral 130 indicates a stopper portion, the numeral 131 (FIG. 5) a guide groove formed in the holder 128, and the numerals 132 and 132 clearance holes for the reel axles 6 and 7.

Figure 20:
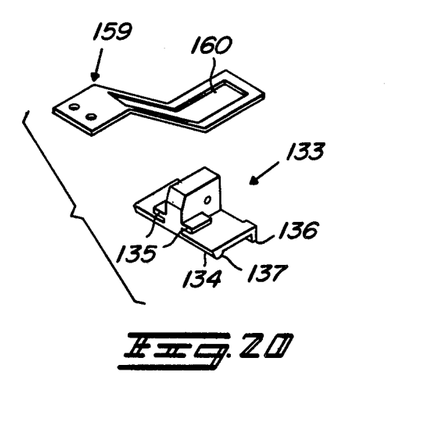
FIG. 20 is a perspective view of a slider member and a slider of the present invention.
Figure 22:
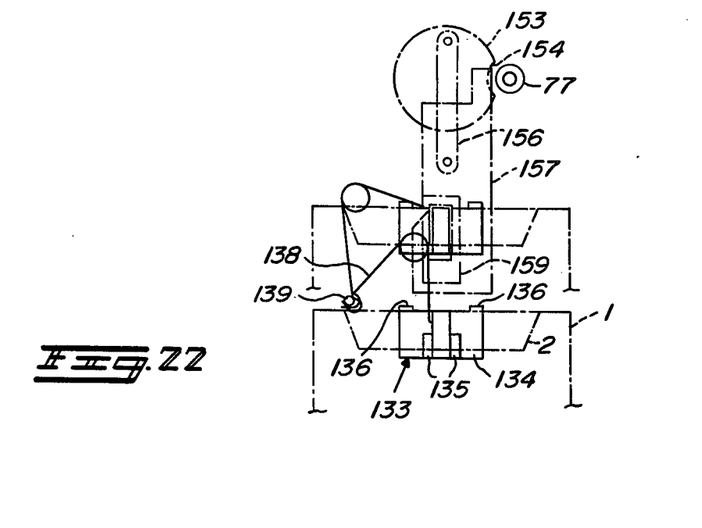
FIG. 22 is a top plan view showing the cassette charging and discharging operation.

In FIGS. 20 and 21, the reference numeral 133 indicates a slider member for sliding movement along the guide groove 131. The slider member 133 comprises a wing 134 and auxiliary wings 135 and 135 for assuring the sliding movement. The wing 134 is formed with tongues 136 and 136 projecting downwards into the holder 128 and also a projection 137 of substantially triangular cross section extending downwards for engagement with the projection 2 of the cassette 1. The reference numeral 138 (FIG. 22) designates a toggle spring disposed between a pin 139 on the holder 128 and the slider member 133 and the force of the toggle spring 138 is reversed as the slider member 133 moves.

In FIG. 4, the reference numeral 140 indicates a recess into which the slider member 133 can escape. The holder 128 is normally within the cartridge entryway 120 and is lowered in response to inserting the cassette 1 or the cartridge 3 into the entryway 120 (see FIGS. 19 and 23).

As shown in FIGS. 3, 4 and 6, the cover 141 is attached through shaft 112 and the spaced projections 121 and 121 extended on the intermediate base plate 113 to the base frame 5. The reference numerals 143 and 143 designate leaf springs provided with rollers (not shown) for pressing the cartridge 3 downwards. The reference numeral 144 indicates a lever provided at one end with a retainer roller 145 engageable with a notch 4 formed on the side wall of the tape cartridge 3, and the lever 144 is rotatable about a shaft 146. The reference numeral 147 indicates a toggle spring disposed between a pin 148 provided on the one end of the lever 144 and a pin 149 provided on the cover 141. The reference numeral 150 indicates a slide lever which is connected to the lever 144 and which is provided at one end with a projection 151 extending into the cartridge entryway 120.

In FIG. 6, the reference numeral 152 designates a discharging mechanism for discharging the cassette 1 and the cartridge 3. The discharging mechanism 152 comprises a rotary member 153 formed with a recess 154. The drive rotor 77 provided on the cartridge capstan axle 9 is normally in place facing the recess 154 of the rotary member 153 and is out of engagement from the rotary member 154. The rotary member 154 is rotated by the drive wheel 77 when it comes in engagememt with the drive rotor 77. The discharging mechanism 152 further comprises a crank lever 156 having its one end eccentrically attached to the rotary member 153 so as to reciprocate when the rotary member 153 rotates, an ejecting lever 157 attached to the other end of the crank lever 156 for sliding movement on the cover 141, a biasing member 161 such as a toggle spring for providing an initial rotation to the rotary member 153, and a hook lever 162 for restricting the rotation of the rotary member 153. The rotary member 153 is formed with a hole through which a tool for adjusting the azimuth of the magnetic head 114 can be passed. The ejecting lever 157 has a shaft 158 (see FIGS. 3 and 19) in engagement with the lever 144 for rotating the lever 144 and also on the under surface thereof a slider 159 (see FIGS. 20 and 21) extending into the cartridge charging path 120 in engagement with the slider member 133 of the holder 128 for returning back the slider member 133 to its original position. The slider 159 comprises a resilient member such as a leaf spring as shown in FIG. 20. Also, the slider 159 is formed with an elongated opening 160.

Figure 18:
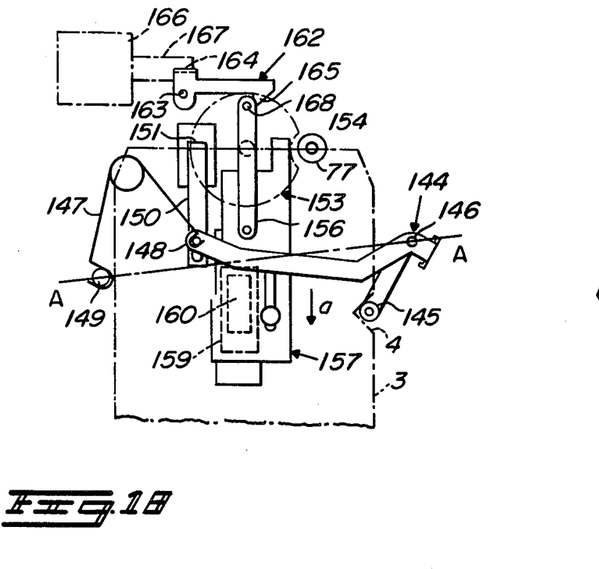
FIG. 18 is a top plan view showing the cartridge charging and discharging operation.

As shown particularly in FIG. 18, the hook lever 162 is pivotally mounted to the cover 141 through the shaft 163, and one end of the lever 162 is provided with a projection 164 coupled to a plunger member 167 of a solenoid plunger 166 mounted on the cover 141 and the other end of which is provided with a hook portion 165 in engagement with a shaft 168 of the crank lever 156 for normally maintaining the rotary member 153 out of engagement from the drive rotor 77. The biasing member 161 (FIG. 6), such as a toggle spring, is disposed between the shaft 163 of the hook lever 162 and the shaft 168 of the crank lever 156 for providing an initial rotation to the rotary member 153 so as to bring the rotary member 153 into engagement with the drive rotor 77 when the level 156 is released by hook portion 165.

In FIG. 4, the reference numerals 169 and 169 indicate guide rollers disposed on the under surface of the cover 141 for guiding the cartridge 3 when it is inserted.

In FIG. 6, the reference numerals 170 and 171 designated switches for energizing the solenoid plunger 125. The switches 170 and 171 having operational elements extending into the cartridge charging path 120 so that the cartridge 3 or the cassette 1 pushes the operation elements to activate the switches 170 and 171, respectively, when it is inserted into the charging path entryway 120.

The operation of the magnetically recording and reproducing apparatus constructed in accordance with the present invention will now be described.

Figure 19:
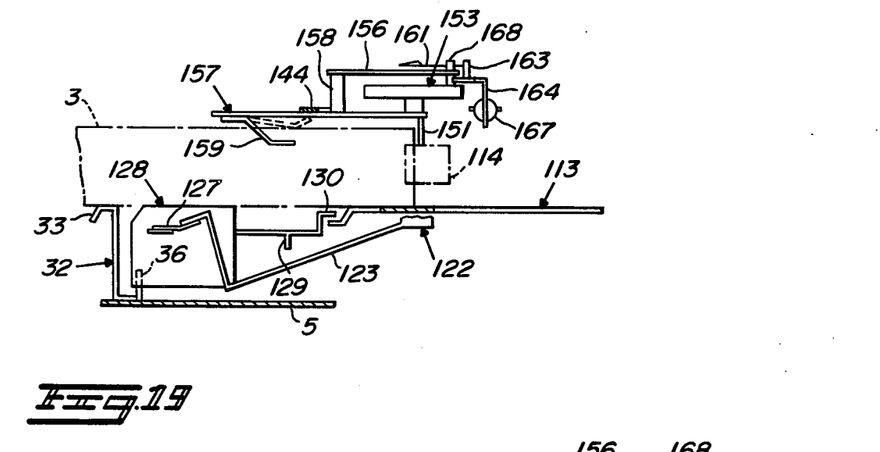
FIG. 19 is a side view showing the cartridge charged in the entryway.

Reference is made initially to the cartridge charging and discharging operation in connection with FIGS. 3, 4, 6, 18, and 19. Assuming first of all that a cartridge has not yet been inserted into the entryway 120, the solenoid plunger 125 (FIG. 21) is in an inactive state and does not attract the plunger member 126 and the holder 128 is placed in the charging path 120 as shown in FIGS. 3 and 4. When the cartridge 3 is inserted into the charging path 120 along the shoulders 33 and 33 of the front plate 32 and the guide rollers 169 and 169, part of the cartridge 3 pushes the operational element (not shown) of the switch 170 which extends into the cartridge charging path 120 to energize the solenoid plunger 125 and move the plunger member 126. The movement of the plunger member 126 causes the projection 124 (see FIG. 23) of the movable member 122 to rotate the movable member 122 so that the holder 128 is moved downwards from the charging path 120 (as shown in FIG. 19), thereby permitting the cartridge 3 to be pushed deeper in the entryway 120. When the cartridge 3 is inserted deeper in the charging path 120 it pushes the projection 151 of the slide lever 150 and the lever 144 is rotated against the force of the toggle spring 147. The force of the toggle spring 147 is reversed at the time when the pin 148 of the lever 144, to which the one end of the toggle spring 147 is attached, shifts over the line A—A (see FIG. 18) passing through the shaft 146 (about which the lever 144 rotates) and the pin 149 (to which the other end of the toggle spring 147 is attached). The reversed force of the toggle spring 147 causes the lever 144 to further rotate in the same direction so as to bring the retainer roller 145 formed on the lever 144 into engagement with the notch 4 formed on the side wall of the cartridge 3, whereby the cartridge 3 can be held in a predetermined position. In this position of the cartridge 3, the magnetic tape contained in the cartridge 3 is in cooperative engagement with the magnetic head 114 disposed on the intermediate base plate 113, the cartridge capstan drive 9, and the contact switch 117, so that the magnetic tape can be subjet to the recording or reproducing operation. At this time, the leaf spring 143 on the cover 141 serves to push the cartridge 3 downwards so as to prevent the cartridge 3 from shaking vertically up and down, and also the slider 159, which is formed of a resilient material, is pressed upwards by the cartridge 3 (FIG. 19).

In order to discharge the cartridge 3 placed in the predetermined position, a discharging switch, not shown, may be operated to instantaneously energize the solenoid plunger 166 (see FIG. 18) so as to attract the plunger member 167. This causes the hook lever 162 to rotate to bring the hook portion 165 thereof out of engagement with the shaft 168 by which the crank lever 156 is pivotally mounted to the rotary member 153. This permits the biasing member 161 (FIG. 6) to provide an initial rotation to the rotary member 153 so as to bring the rotary member 153 into engagement with the drive rotor 77 provided on the cartridge capstan drive 9. As a result, the rotation of the drive rotor 77 is transmitted to the rotary member 153 which is thereby rotated causing the crank lever 156 to move toward and push the ejecting lever 157 in the direction indicated by the arrow a in FIG. 18. The movement of the ejecting lever 157 becomes maximum in a half rotation of the rotary member 153 and the ejecting lever 157 moves in the reverse direction in the next half rotation of the rotary member 153. When the rotary member 153 makes a full rotation, the hook portion 165 of the hook lever 162 engages the shaft 168 so as to retain the rotary member 153 from further engagement with the drive rotor 77 until the next time the solenoid 166 is energized.

As the ejecting lever 157 moves in the direction indicated by the arrow a (FIGS. 18 and 19), the pin 158 provided on the ejecting lever 157 pushes the lever 144 against the force of the toggle spring 147 to rotate the lever 144. When the pin 148 of the lever 144 shifts over the line A—A in FIG. 18, the lever 144 is returned back to the original position as shown in FIG. 6 by the force of the toggle spring 147. As the lever 144 moves back to the original position, the roller 145 of the lever 144 is moved out of engagement from the notch 4 of the cartridge 3 and the slide lever 150 is also returned to its original position so that the projection 151 of the slide lever 150 pushes and discharges the cartridges 3 from the entryway 120. When the cartridge 3 is discharged from the charging path 120, the operational element of the switch 170 is moved to its original position to deenergize the solenoid plunger 125. As a result, the plunger 126 moves back to its original position to rotate the movable member 122 so as to move the holder 128 upwards into the cartridge entryway 120.

Figure 23:
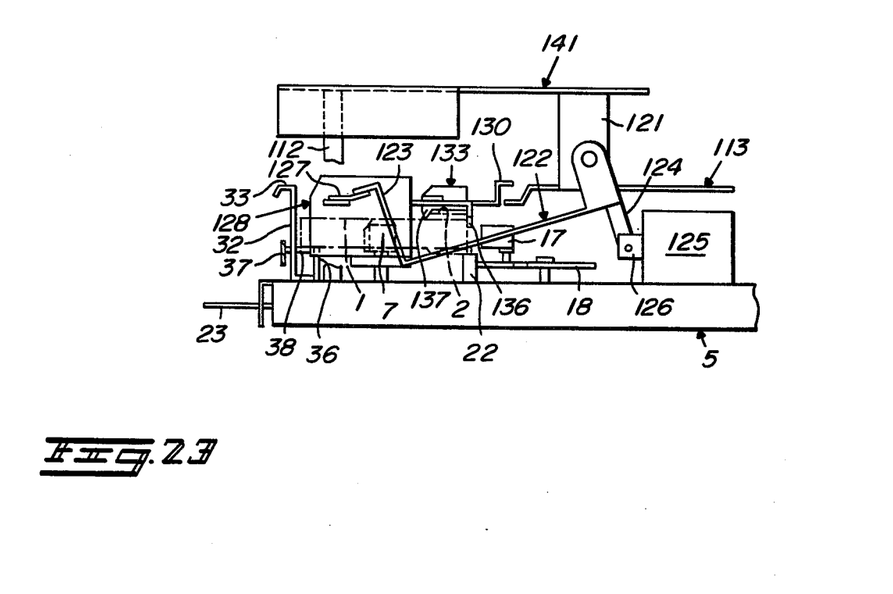
FIG. 23 is a side view showing the cassette charged and placed in a predetermined position.

Reference is now made to the cassette charging and discharging operation in connection with FIGS. 4 and 21 to 23. Before the cassette 1 is inserted to the holder 128, the holder 128 is positioned within the cartridge entryway 120, the slider member 133 is in the recess 140 of the holder 128, and the projection 137 of the slider member 133 is out of the cassette entryway formed by the holder 128. When the cassette 1 is inserted through the cassette charging path into the holder 128, the front edge of the cassette 1 pushes the legs 136 and 136 of the slider member 133 so as to move the slider member 133 against the force of the toggle spring 138. When the slider member 133 is moved out of the recess 140, the projection 137 moves downwards into engagement with the projection 2 of the cassette 1. When the cassette 1 is pushed further, the force of the toggle spring 138 is reversed so as to permit the slider member 133 to automatically move along the guide groove 131 thereby to move the cassette 1 deeper into a predetermined position in the holder 128. In the predetermined position of the cassette 1 in the holder 128, the operational element (not shown) of the switch 171 is actuated so as to energize the solenoid plunger 125 and attract the plunger member 126. This causes the projection 124 of the movable member 122 to rotate the movable member 122 so that the holder 128 is moved downwards from the cartridge entryway 120 until the cassette 1 rests on the spaced projections 36 formed on the front plate 32 and the guide pins 22 formed on the base frame 5, where the cassette 1 comes into cooperative engagement with the reel axles 6 and 7 as shown in FIG. 23. The spaced projections 36 and the guide pins 22 have a function of preventing the cassette 1 from further moving downwards and thus the upper part of the holder 128 remains in the cartridge entryway 120. If the cartridge 3 is intended to be inserted into the cartridge entryway 120 in such state, the cartridge 3 will abut to the upper part of the holder 128 and cannot be inserted. By comparing FIGS. 19 and 23 it can be seen that the projections 36 do not prevent full retraction of the holder 128 from the entryway 120 if a cassette is not within the holder 128. Also, when the cassette 1 is placed in the predetermined position, since the projection 137 of the slider member 133 remains in engagement with the projection 2 of the cassette 1 and the sliding member 133 is pressed toward the magnetic tape head 17 by the force of the toggle spring 138, the cassette 1 is securely held in the position. Furthermore, as the cassette 1 is being inserted, the cassette 1 cannot operate the switch 170 since the cassette 1 has a thickness dimension less than the cartridge 3. Therefore only when the cassette actuates the switch 171 is the holder 128 lowered and this occurs only when the cassette has been fully inserted into the holder 128.

In order to discharge a loaded cassette placed in its predetermined position in engagement with the magnetic head 17, a discharging switch, not shown, may be operated to deenergize the solenoid plunger 125 so as to move back the plunger 126 to the initial position. As a result, the movable member 122 rotates, causing the holder 128 to be returned to the original position within the cartridge charging path 120. Thereafter, the solenoid plunger 166 is energized so as to cause the rotary member 153 to make a full rotation and the ejecting lever 157 to make a reciprocation as described previously in connection with the cartridge discharging operation. As the ejecting lever 157 is reciprocating, the elongated opening 160 formed in the sliding member 159 hooks the slider member 133 and slides it along the guide groove 131 of the holder 128 so as to move the slider member 133 against the force of the toggle spring 138. As the slider member 133 is slid, the force of the toggle spring 138 is reversed to move the slider member 133 automatically to its original position in the recess 140. As this occurs the cassette 1, which is in engagement with the legs 136 of the slider member 133, moves as the slider member 133 moves and the engagement between the cassette 1 and the projection 137 of the slider member 133 is released when the slider member 133 returns into the recess 140, thereby premitting the cassette 1 to be discharged.

The operation of the safety member 37 and the anti-miserase member 44 will now be described with reference to FIGS. 3, 4, and 7 to 9. First of all, when no cassette 1 is inserted and the holder 128 is placed in the cartridge entryway 120 as shown in FIGS. 3 and 4, the safety member 37 is maintained in the position shown in FIG. 4 where the pin 38 is brought in engagement with the upper edge of the aperture 34 formed in the front plate 32 by the force of the spring member 42. The safety member 37 also has the key 39 extending downwards into engagement with the extension 30 of the stopper member 29 so as to prevent the stopper member 29 from moving in the direction indicated by the arrow b in FIG. 8. In such state, the operation rods 23 to 27 cannot be pushed. At the same time the anti-miserase member 44 is in the forwardly rotated position with its leg 45 being pushed down by the second arm 41 of the safety member 37 so that the arm 46 of the anti-miserase member 44 does not project inwardly through the aperture 35 formed in the front plate 32.

When the cassette 1 is inserted into the holder 128, the cassette 1 is lowered in the predetermined position as described hereinbefore. As the cassette 1 is being lowered, the cassette 1 pushes down the pin 38 of the safety member 37 to rotate the safety member 37 in the direction indicated by the arrow c in FIG. 9 so as to release the engagement between the key 39 and the stopper member 29 thereby permitting the operation rods 23 to 27 to be pushed. While at the same time, the rotation of the safety member 37 causes the second arm 41 of the safety member 37 to move out of pressure contact with the leg 45 of the anti-miserase member 44. As a result, the anti-miserase member 44 is rotated rearwards by the force of the spring member disposed between the first arm 40 and the leg 45 so that the inturned arm 46 of the anti-miserase member 44 projects inwards through the aperture 35 and into engagement with a hole selectively formed in the side wall of the cover of the cassette 1, the hole being formed in the cassette cover in order that the magnetic tape cannot be subject to erasing operation. When the arm 46 moves inwardly so as to project through the aperture 35 and into the cassette cover hole, it pushes down the key member 48 against the force of the spring member 50 into engagement with the extension 28 of the recording operation rod 23 so as to prevent the operation of the recording operation rod 23 as shown in FIG. 8. Of course, if the hole of the inserted cassette 1 is covered with a cover, the arm 46 of the anti-miserase member 44 cannot push down the key member 48 and the recording operation rod 23 remains free to be pushed because the arm 46 will abut on the cassette cover and cannot make any further inward movement.

Figure 15A:
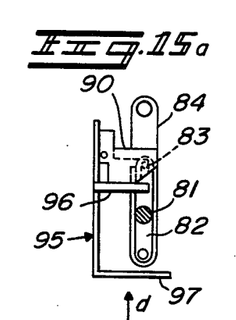
FIGS. 15a to 15d are top plan views showing the operation of a portion of the torque reducing mechanism in FIG. 10.
Figure 15B:
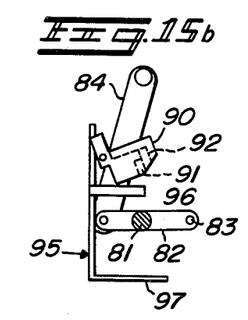
Figure 15C:
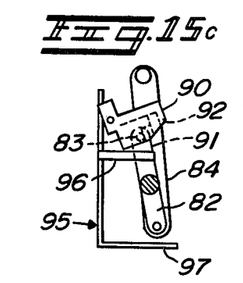

The cassette reproducing operation will now be described with reference to FIGS. 10 and 15 to 17. When the reproducing operation rod 24 is pushed in the direction indicated by the arrow d in FIG. 16a, the reproducing operation member 61 is moved in the same direction so that part of the stopping arm 64 pushes and slightly rotates the rotary arm 71 while at the same time the operation member 67 provided on the reproducing operation member 61 is moved to push the release arm 95. Consequently, the projection 96 of the release arm 95 pushes and rotates the restricting member 90 so as to release the engagement between the second leg 92 of the restriction member 90 and the pin 83 of the rotary lever 82 (see FIG. 15a). As a result, the biasing member 99 (FIG. 6) provides an initial rotation to the rotary member 78 thereby permitting the rotary member 78 to come into engagement with the drive wheel 77 provided on the cartridge capstan axle 9. The rotation of the drive wheel 77 is transmitted to the rotary member 78 and hence through the rotary shaft 81 to the rotary lever 82 which is thereby rotated as shown in FIG. 15b. The rotation of the rotary lever 82 causes the crank 84 to rotate so as to move the sliding member 85 in the direction indicated by the arrow d in FIG. 16a. The movement of the sliding member 85 becomes maximum in a half rotation of the rotary lever 82 and the sliding member 85 returns to the original position in the next half rotation of the rotary member 85; that is, the sliding member 85 makes a substantially reciprocal movement as the rotary member 78 makes a full rotation. Also, as the rotary lever 82 makes substantially a full rotation, the pin 83 of the rotary lever 82 comes into engagement with the first leg 91 of the restriction member 90 as shown by broken lines of FIGS. 15c and 15d so as to maintain the rotary member 78 again out of engagement with the drive wheel 77 with the recess 79 of the rotary member 78 facing the drive wheel 77.

The operation of the sliding member 85 reciprocating with the rotation of the rotary lever 82 will be described in detail with reference to FIGS. 16a to 16c. As shown in FIG. 16a, the hook lever 108 is maintained stationary against the force of the spring member 111 in the direction indicated by the arrow e since the hook lever 108 is pivotally mounted on the sliding member 85 and has its projection 110 abutted on the stopper 102 provided on the auxiliary frame 100 before the rotary lever 82 rotates. When the sliding member 85 moves, the engagement between the projection 110 and the stopper 102 is released and the hook lever 108 is rotated by the force of the spring member 111 in the direction indicated by the arrow e until the hook lever 108 abuts on the second projection 88 of the sliding member 85. When the sliding member 85 further moves, the hook portion 109 of the hook lever 108 comes into engagement with the stopper 73 of the rotary arm 71 as shown in FIG. 16b and rotates the rotary arm 71. The rotation of the rotary arm 71 causes the stopper 73 thereof to engage the stopping arm 64 of the reproducing operation member 61 to slightly rotate the stopping arm 64 against the force of spring member 66. Just before the sliding member 61 moves to the maximum extent, the stopper 73 is released from the stopping arm 64 so that the stopping arm 64 returns to the original position, while the stopper 73 remains in engagement with the stopper 65 of the stopping arm 64 as shown in FIG. 16c. The sliding member 85 and the hook lever 108 return to their original positions after the sliding member 61 moves to the maximum extent. At this time, the rotary arm 71 remains in engagement with the stopping arm 64 as described before. Thus, by the rotation of the rotary arm 71, the head supporter 18 is moved through the spring member 74 (see FIG. 1) to a predetermined position so that the magnetic head 17 and the pinch roller 19 disposed thereon are brought into cooperative engagement with the magnetic tape (not shown) contained in the cassette 1 for the reproducing operation.

In order to release the reproducing operation, the stopping operation rod 25 may be operated to release the reproducing operation rod 24 from the stopper member 29. Thereby the reproducing operation rod 24 and the reproducing operation member 61 return to their original positions. While at the same time, the rotary arm 71 is released from the stopping arm 64 and the rotary arm 71 and the head supporter 18 return to their original positions.

Figure 15D:
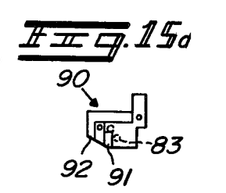

As the reproducing operation member 61 returns to its original position, the release arm 95 returns to its original position and the restriction member 90 also returns to its original position by the force of the spring member 94. At this time, the pin 83 engaged with the first leg 91 moves from the position indicated by the broken line to the position indicated by the solid line as shown in FIG. 15d, and finally engages the second leg 92 of the restriction member 90 as indicated by the solid line.

Reference is now made to the cassette recording operation in connection with FIGS. 10 and 13 to 15. Normally, the recording operation is completed with operating both the reproducing operation rod 24 and the recording operation rod 23 at the same time. The operation of the reproducing operation rod 24 is similar to the description made in connection with the reproducing operation, and therefore it is not repeated here, and only the operation of the recording operation rod 23 is described below. When the recording operation rod 23 is pushed from the rest position as shown in FIGS. 13a and 14a in the direction indicated by the arrow d, the recording operation member 51 also moves in the same direction so that the drive member 52 of the recording operation member 51 pushes the stopper 69 of the recording lever 68 so that the recording lever 68 moves to the position as shown in FIGS. 13b and 14b while at the same time the drive portion 53 of the recording operation member 51 pushes the bent portion 97 of the release arm 95 to rotate the restriction member 90. This causes the torque reducing mechanism 76 to operate in the similar manner described previously in connection with the reproducing operation and the rock lever 103 of the sliding member 85 starts to move so as to move the rock lever 103 out of engagement with the projection 107 formed on the base frame 5. As a result, the rock lever 103 is pivotally moved downward by the force of the spring member 106 so that the elongated opening 104 thereof hooks the projection 70 of the recording lever 68 (see FIG. 14c) to move it in the direction indicated by the arrow d. As the recording lever 68 is moving, it operates a not shown switch. The recording lever 68 slightly rotates the stopper arm 55 on its way and stops rotating the stopper arm 55 when the movement of the recording lever 68 reaches its maximum. As a result, the stopper arm 55 is returned to its original position by the force of the spring member 59 and comes into engagement with the stopper 69 of the recording lever 68. Thereafter, the rock lever 103 is returned to the original position by the function of the torque reducing mechanism 76 coming into engagement with the projection 107 formed on the base frame 5. When the stop operation rod 25 is operated, both the recording and reproducing operation rods 23 and 24 are returned to their original positions in the similar manner described previously in connection with the reproducing operation.

While the invention has been particularly shown and described with reference to preferred embodiments thereof, it will be understood by those skilled in the art that the foregoing and other changes in form and details may be made therein without departing from the spirit and scope of the invention as stated in the following claims.

I claim:

1. A magnetic recording and/or reproducing apparatus which is selectively applicable to utilize either a tape carrier of a first or second type and includes first and second tape capstans, said apparatus comprising:

an entryway into which tape carriers of said first and second type are to be inserted;

a first magnetic tape head located within said entryway for playing the tape contained in said first type tape carriers;

a second magnetic tape head located out of said entryway for reproducing the tape contained in said second type tape carriers;

a holder for receiving and conveying a second type tape carrier; and means for positioning said holder in said entryway prior to the insertion of tape carriers into said entryway, said means responsive to a first type tape carrier being inserted into said entryway for moving said holder out of said entryway thereby permitting said first tape carrier to be pushed deeper into said entryway so that the tape in said first type tape carrier comes into cooperative engagement with said first magnetic tape head and said first capstan, and said means responsive to said second type tape carrier being received in said holder for moving said holder and second type carrier into a predetermined position substantially out of said entryway where the tape in said second type tape carrier comes into cooperative engagement with said second magnetic tape head and said second tape capstan out of said entryway.

2. A magnetic recording and/or reproducing apparatus according to claim 1 which includes reel drive axles for said second type tape carriers and wherein said first type tape carriers are tape cartridges and said second type tape carriers are tape cassettes.

3. A magnetic recording and/or reproducing apparatus according to claim 2 wherein said second magnetic head is located below said entryway and said means moves said holder downward in response to the insertion of tape cartridges and tape cassettes into said entryway.

4. A magnetic recording and/or reproducing apparatus according to claim 3 wherein said means comprises a movable member connected to said holder, a switch device having first and second elements, said first element of which is so disposed in said entryway that insertion of a tape cartridge into said entryway will push said first element to actuate said switch device and said second element of which is so disposed with respect to said holder that insertion of a tape cassette into said holder will push said second element to actuate said switch device, and a plunger device having a plunger member connected to said movable member which is actuated to move said plunger member when said switch device is actuated, thereby permitting said movable member to move said holder in a downward direction.

5. A magnetic recording and/or reproducing apparatus according to claim 4 wherein said plunger device is a solenoid device.

6. A magnetic recording and/or reproducing apparatus according to claim 4 wherein said means includes additional means for preventing said holder from being moved totally out of said entryway in response to a tape cassette being inserted into said holder and brought into engagement with said second head, whereby said additional means prevents the insertion of a tape cartridge into said entryway when a tape cassette is already inserted in said holder.

7. A magnetic recording and/or reproducing apparatus according to claim 6 wherein said additional means comprise at least one projection which coacts with a tape cassette inserted in said holder.

8. A magnetic recording and/or reproducing apparatus according to claim 2, which further comprises a discharging mechanism for discharging a tape cartridge from said entryway, said mechanism including a pushing member for pushing out said cartridge from said entryway, a drive wheel coupled to one of said tape capstans, a rotary member, a crank lever eccentrically and pivotally mounted on said rotary member for moving toward said pushing member to push the same, and means for selectively engaging and releasing said rotary member from said drive wheel, whereby said cartridge can be removed from said entryway by use of the capstan torque.

9. A magnetic recording and/or reproducing apparatus according to claim 8, wherein said selectively engaging and releasing means of said discharging mechanism comprises said rotary member formed with a recess, locking means for placing said rotary member in a position with said recess facing to said drive wheel so as to maintain said rotary member out of engagement from said drive wheel, means for releasing said rotary member from the locked-in position, and biasing means for providing an initial rotation to said rotary member thereby bringing said rotary member into engagement with said drive wheel so that rotation of said drive wheel can be transmitted to said rotary member.

10. A magnetic recording and/or reproducing apparatus according to claim 8 which includes a member coupled to said pushing member for discharging a tape cassette from said holder.

11. A magnetic recording and/or reproducing apparatus according to claim 2 which includes having a discharging mechanism for tape cartridges that includes a rotary member selectively coupled to a drive wheel coupled to one of said tape capstans and a head positioning mechanism for positioning at least one of said tape heads also including a rotary member selectively coupled to said drive wheel.

* * * * *